US012752915B1

(12) United States Patent
Burns

(10) Patent No.: US 12,752,915 B1
(45) Date of Patent: Oct. 6, 2026

(54) VERTICAL TAKEOFF AND LANDING AERONAUTICAL APPARATUS WITH A FOLDING WING

(71) Applicant: Aerhart, LLC, Malibu, CA (US)

(72) Inventor: Kevin Burns, Malibu, CA (US)

(73) Assignee: Aerhart, LLC, Malibu, CA (US)

( * ) Notice: Subject to any disclaimer, the term of this patent is extended or adjusted under 35 U.S.C. 154(b) by 0 days.

(21) Appl. No.: 19/190,570

(22) Filed: Apr. 25, 2025

(51) Int. Cl.
*B64C 29/00* (2006.01)
*B64C 3/56* (2006.01)

(52) U.S. Cl.
CPC ............ *B64C 29/0033* (2013.01); *B64C 3/56* (2013.01)

(58) Field of Classification Search
CPC .............................. B64C 3/56; B64C 29/0033
See application file for complete search history.

(56) References Cited

U.S. PATENT DOCUMENTS 6,783,096 B2 * 8/2004 Baldwin ............... B64C 11/001 244/66
6,845,939 B1 * 1/2005 Baldwin ................ B64U 50/13 244/137.1
7,059,562 B2 6/2006 Baldwin
7,070,145 B2 7/2006 Baldwin
7,887,011 B1 * 2/2011 Baldwin .................. B64D 1/22 294/68.1
2011/0180657 A1 * 7/2011 Gionta ...................... B64C 3/56 244/49
2017/0283052 A1 * 10/2017 Moshe .................... B64C 29/02
2018/0334251 A1 * 11/2018 Karem ................ B64C 29/0033
2023/0067713 A1 * 3/2023 Burns ................. B64C 29/0033
2024/0116624 A1 * 4/2024 Noskowicz ............ B64U 70/50

OTHER PUBLICATIONS

Analysis of the Aerodynamically Deployable Wings and Payload Support Structure of the Mono Tiltrotor, John J. Samsock, M.S. thesis submitted to the University of Maryland, College Park, MD, 2007.

* cited by examiner

*Primary Examiner* — Tye William Abell
(74) *Attorney, Agent, or Firm* — Diana D. Brehob

(57) ABSTRACT

An electric VTOL aeronautical apparatus is disclosed that has folding wings each having an inboard wing portion coupled to an outboard portion via a hinge. Folding wings are known to be used during flight, although using a motor to fold and unfold the wings. In the present disclosure, the motor with its concomitant weight and complication is obviated or reduced by employing the force generated by deploying a control surface in a moving airstream. By controlling this deployment, aero forces on the desired wing portion can be controlled and used to obviate the need for a motorized actuator. Lift generated by the wing and control surface are used to unfold the folding portion of wing, reconfiguring it for forward flight. When the aeronautical apparatus transitions to vertical flight, gravity pulls the wings downward into the folded position.

19 Claims, 9 Drawing Sheets

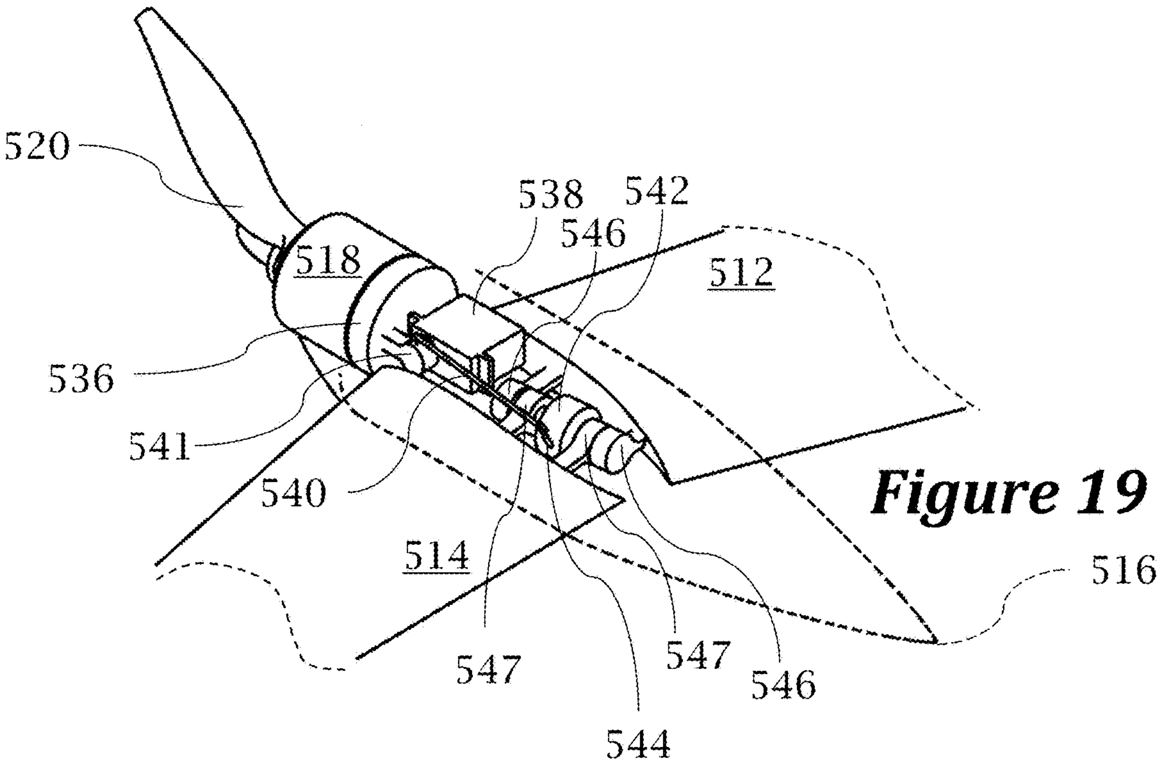
Figure 19
Figure 20
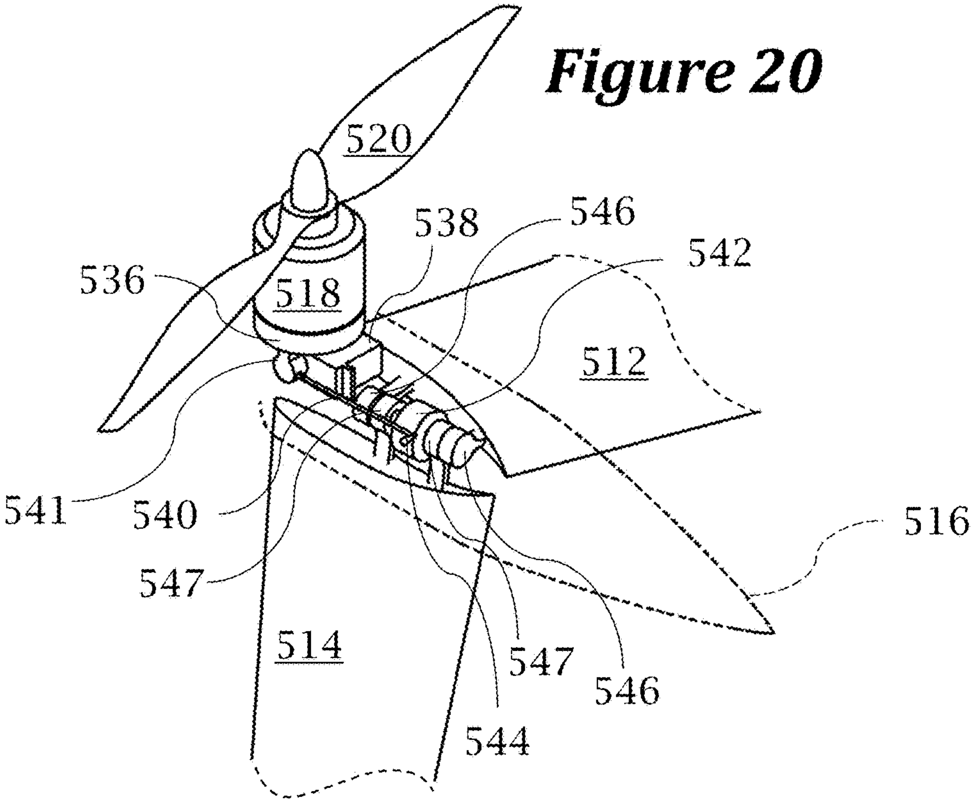

VERTICAL TAKEOFF AND LANDING AERONAUTICAL APPARATUS WITH A FOLDING WING

FIELD

The present disclosure relates to vertical takeoff and landing (VTOL) aircraft, in particular aeronautical vehicles, commonly referred to as unmanned aerial vehicles (UAVs) or drones.

BACKGROUND

Aircraft that can provide Urban Air Mobility (UAM) is a very active area of research around the world, with the electrical takeoff and landing (eVTOL) being of particular interest, such as that disclosed in commonly-assigned, U.S. Pat. No. 11,117,657 B2. The ability of VTOL aircraft to land in a small area is key to its urban use. Commercially-viable eVTOLs have not yet been realized, partly due to insufficient efficiency, leading to decreased mission duration. Toward that end, U.S. Pat. No. 11,117,657 discloses four wings to provide lift during forward flight and propellers that rotate between an orientation for forward flight and an orientation for vertical flight. It is well known to those skilled in the art, that greater efficiency is facilitated by longer wingspan, such as used on glider planes. However, longer wings require more area in which to land, which complicates landing in urban spaces.

To address such a compromise, CN108327906A discloses an aircraft with "two folding wing sections . . . arranged at the two sides of the aircraft body." Folding wings are well known in the prior art for storing aircraft or transporting aircraft more compactly e.g., transporting short-range aircraft in the hull of a ship. In those cases, the wings are folded upward or swept back and not meant to be flown in the folded configuration. The disclosed aircraft in CN108327906A operates in a forward flight mode with the wings fully extended and in vertical flight for landing with the wings folded downward, using servos (motors) to move the wings between the two positions. Servos add weight to the aircraft and draw energy from onboard batteries when actuated, both of which negatively impacts efficiency.

Previously disclosed drone in commonly-assigned application U.S. Ser. No. 17/819,692 is a passive approach to cause a folding wing to move from a take-off position with the wing folded to a forward flight position with the wing unfolded. The rotational axes of the hinges are angled with respect to the longitudinal axis of the fuselage to use aerodynamics to effect the folding and unfolding.

SUMMARY

The Applicant of the present disclosure has recognized that by using ailerons to cause the wings to fold and unfold facilitates more robust actuation of the wings. Furthermore, the prior configuration as taught in U.S. Ser. No. 17/819,692 uses angled hinges to actuate the unfolding of the wing. Presently disclosed is an aeronautical apparatus with folding wings that may be actuated without angled hinges, i.e., that the axis of rotation of the hinges can be substantially parallel to the longitudinal axis of the fuselage.

An aeronautical apparatus is disclosed which has a fuselage with a longitudinal axis, a transverse axis and a vertical axis. The aeronautical apparatus has a first wing attached to a right side of the fuselage and a second wing attached to a left side of the fuselage. The first wing has a first inboard wing portion coupled to a first outboard wing portion via a first hinge. The second wing has a second inboard wing portion coupled to a second outboard wing portion via a second hinge. The first outboard wing portion folds downward with respect to the first inboard wing portion. The second outboard wing portion folds downward with respect to the second inboard wing portion. The first outboard wing portion has a first control surface which is configured to fold with respect to the first outboard wing portion. The second outboard wing portion has a second control surface which is configured to fold with respect to the second outboard wing portion.

An axis of rotation of the first hinge and the second hinge are substantially parallel with respect to the longitudinal axis of the fuselage.

An axis of rotation of the first hinge is skewed with respect to the longitudinal axis of the fuselage. An axis of rotation of the second hinge is skewed with respect to the longitudinal axis of the fuselage.

The first and second hinges are rotationally damped.

The aeronautical apparatus also includes a first damper adjacent to the first hinge to provide the rotational damping of the first hinge, a second damper adjacent to the second hinge to provide the rotational damping of the second hinge, a first torque adjusting motor adjacent to the first damper, and a second torque adjusting motor adjacent to the second damper. The first torque adjusting motor, when actuated, changes the amount of damping of the first damper. The second torque adjusting motor, when actuated, changes the amount of damping of the second damper.

The aeronautical apparatus further includes: a first nacelle coupled to the inboard portion of the first wing, a second nacelle coupled to the inboard portion of the second wing, a first propeller motor disposed within the first nacelle, a second propeller motor disposed within the second nacelle, a first propeller coupled to the first propeller motor, and a second propeller coupled to the second propeller motor.

The aeronautical apparatus, further includes: a first thrust angle motor located within the first nacelle and coupled to the first propeller motor and a second thrust angle motor located within the second nacelle and coupled to the second propeller motor. The first and second thrust angle motors each have an axis of rotation roughly parallel to the transverse axis.

The aeronautical apparatus, further including: a first landing pole connected to a tip of the first outboard wing portion and a second landing pole connected to a tip of the second outboard wing portion.

The first and second inboard wing portions are rotatable with respect to the fuselage.

A chord of the first inboard wing portion and a chord of the second inboard wing portion are substantially parallel to a vertical axis of the fuselage.

The first inboard wing portion has a control surface which is configured to fold and the second inboard wing portion has a control surface that is configured to fold.

The control surface of the first inboard wing portion is folded so that it is substantially parallel to the vertical axis during vertical flight. The control surface of the second inboard wing portion is folded so that it is substantially parallel to the vertical axis during vertical flight.

The first wing has a folded position and an unfolded position. The second wing has a folded position and an unfolded position. The aeronautical apparatus further includes: a first latching mechanism associated with the first hinge to restrain the first outboard wing portion to remain in the folded position during landing and a second latching mechanism associated with the second hinge to restrain the second outboard wing portion to remain in the folded position during landing.

The aeronautical apparatus further including a first one-way bearing associated coupled on axis with the first hinge, a second one-way bearing coupled on axis with the second hinge, a first switch coupled to and actuated by the first thrust angle motor and a second switch coupled to and actuated by the second thrust angle motor. The first switch is coupled to the first one-way bearing. The second switch is coupled to the second one-way bearing. The first switch, when actuated by the first thrust angle motor, toggles between a first setting in which the first outboard wing portion is allowed to rotate from a folded position to an unfolded position only and a second setting in which the first outboard wing portion is allowed to rotate from the unfolded position to the folded position only. The second switch, when actuated by the second thrust motor, toggles between a first setting in which the second outboard wing portion is allowed to rotate from a folded position to an unfolded position only and a second setting in which the second outboard wing portion is allowed to rotate from the unfolded position to the folded position only.

The aeronautical apparatus further includes: a first switch coupled to a first selectable, one-way bearing coupled on axis to the first hinge and a second switch coupled to a second selectable, one-way bearing coupled on axis to the second hinge. When the first switch is in a first position, the first one-way bearing only allows rotation a first rotational direction to thereby allow the first wing to fold. When the first switch is in a second position, the first one-way bearing only allows rotation in a second rotational direction to thereby allow the first wing to unfold. When the second switch is in a first position, the second one-way bearing only allows rotation in the second rotational direction to thereby allow the second wing to fold. When the second switch is in a second position, the second one-way bearing only allows rotation in the first rotational direction to thereby allow the second wing to unfold.

The aeronautical apparatus further includes: an electronic control unit (ECU) configured to communicate signals to the first control surface and the second control surface. The ECU determines a desired control surface deployment of the first control surface and second control surface based at least on a fold angle of the first hinge and second hinge.

The aeronautical apparatus further includes: a first latching mechanism associated with the first inboard wing portion to restrain the first outboard wing portion to remain in the folded position during landing and a second latching mechanism associated with the second inboard wing portion to restrain the second outboard wing portion to remain in the folded position during landing.

The aeronautical apparatus further includes: a first latching mechanism associated with the control surface of the first inboard wing portion to restrain the first outboard wing portion to remain in the folded position during landing and a second latching mechanism associated with the control surface of the second inboard wing portion to restrain the second outboard wing portion to remain in the folded position during landing.

Also disclosed is an aeronautical apparatus that has a fuselage having a longitudinal axis, a transverse axis and a vertical axis, a first wing attached to a right side of the fuselage and a second wing attached to a left side of the fuselage. The first wing has a first inboard wing portion coupled to a first outboard wing portion via a first hinge. The second wing has a second inboard wing portion coupled to a second outboard wing portion via a second hinge. The first outboard wing portion folds downward with respect to the first inboard wing portion. The second outboard wing portion folds downward with respect to the second inboard wing portion. The first and second inboard wing portions are rotatable along an axis substantially parallel to the transverse axis. The first outboard wing portion has a first control surface which is configured to fold with respect to the first outboard wing portion. The second outboard wing portion has a second control surface which is configured to fold with respect to the second outboard wing portion.

The aeronautical apparatus further includes a first latching mechanism associated with the first hinge to restrain the first outboard wing portion to remain in the unfolded position during forward flight and a second latching mechanism associated with the second hinge to restrain the second outboard wing portion to remain in the unfolded position during forward flight.

Also disclosed is an aeronautical apparatus having a first wing attached to a right side of the fuselage a second wing attached to a left side of the fuselage. The first wing has a first inboard wing portion coupled to a first outboard wing portion via a first hinge. The second wing has a second inboard wing portion coupled to a second outboard wing portion via a second hinge. The first hinge allows the first outboard wing portion to fold downward with respect to the first inboard wing portion. The second hinge allows the second outboard wing portion to fold downward with respect to the second inboard wing portion. The first inboard wing portion has a first inboard control surface which is configured to fold. The second inboard wing portion has a second inboard control surface that is configured to fold. The first outboard wing portion has a first outboard control surface which is configured to fold with respect to the first outboard wing portion. The second outboard wing portion has a second outboard control surface which is configured to fold with respect to the second outboard wing portion.

BRIEF DESCRIPTION OF THE DRAWINGS

FIG. 19 shows a nacelle positioned between inboard and outboard wing portions with a hinge mechanism disposed within and the outboard wing portion unfolded for forward flight; and FIG. 20 shows the nacelle of FIG. 19 with the outboard wing portion folded for vertical flight.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
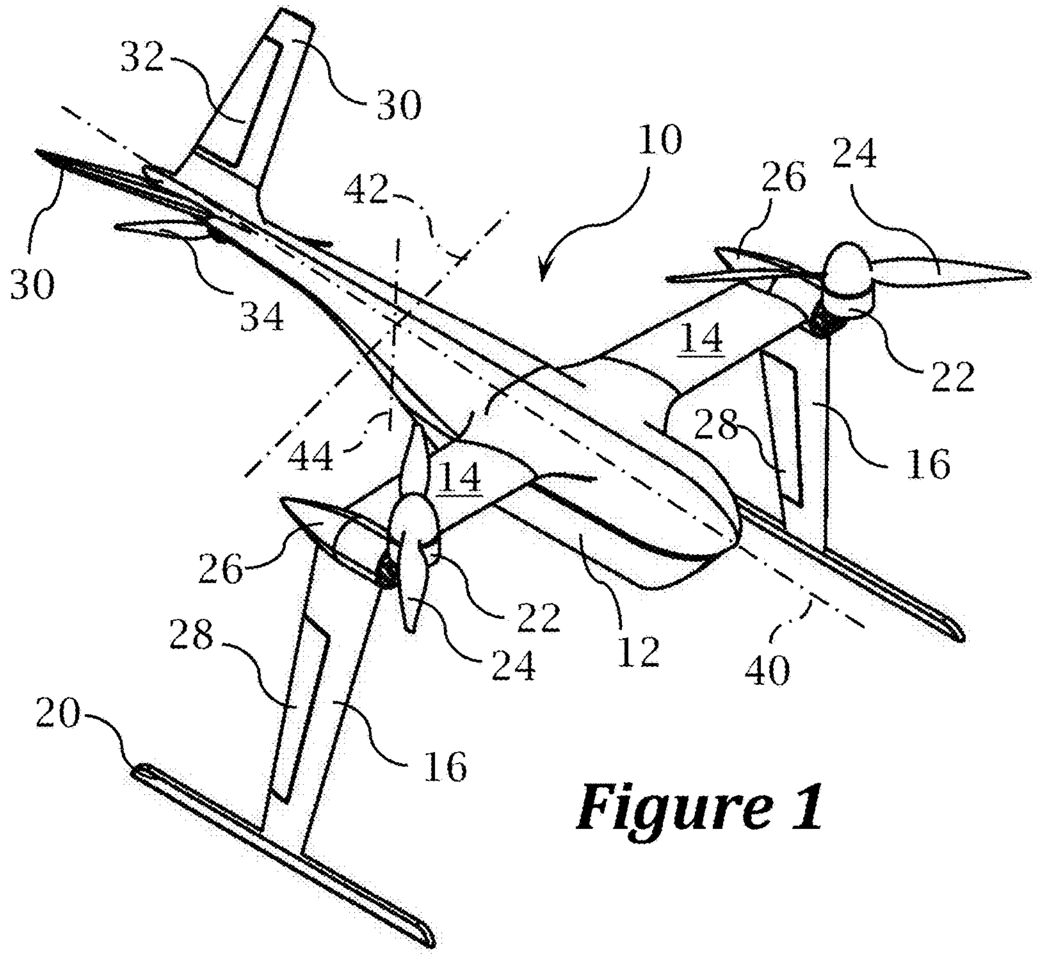
FIG. 1 shows an aeronautical apparatus with outboard wing portions folded and propellers oriented for vertical flight.

An aeronautical apparatus 10 according to an embodiment of the disclosure is shown in FIG. 1 configured for vertical flight. It has a fuselage 12 with a longitudinal axis 40, a transverse axis 42, and a vertical axis 44. (The nomenclature relevant to the axes as illustrated in FIG. 1 is applicable to all embodiments in the present disclosure.) Aeronautical apparatus 10 has a pair of wings each having two portions: an inboard wing portion 14 and an outboard wing portion 16. The wings fold at the location of nacelle 26 between inboard wing portion 14 and outboard wing portion 16. A propeller motor 22 with a propeller 24 coupled thereto is coupled to nacelle 26. Each of outboard wing portion 16 has an outboard control surface 28, which can be referred to as an aileron, and a landing pole 20. Landing poles 20 are aerodynamically designed for low drag. Alternatively, any other suitable landing gear can be employed. Aeronautical apparatus 10 has three propellers, two propellers 24 in which the axis of rotation can be changed and one fixed propeller 34 in which the axis of rotation is fixed. Fixed propeller 34 is used during vertical flight. Aeronautical apparatus 10 has a V-tail configuration with two stabilizers 30 that form a V. Each stabilizer 30 has an aft control surface 32, often called a ruddervator. Alternatively, a more conventional T-tail configuration can be employed, or any other suitable configuration.

Figure 2:
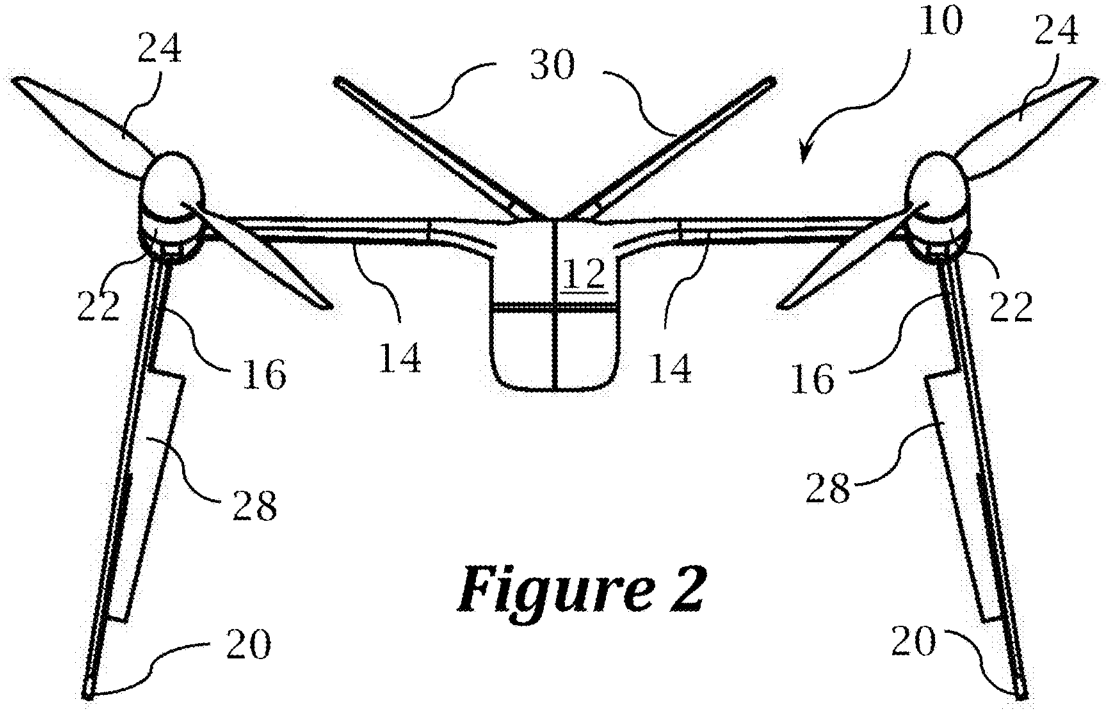
FIG. 2 shows a front view of the aeronautical apparatus of FIG. 1 with outboard control surfaces positively deployed (toward the fuselage when outboard wing portion is folded) to cause the outboard wing portions to unfold, and the propellers oriented at an angle to facilitate transition from vertical to forward flight.
Figure 3:
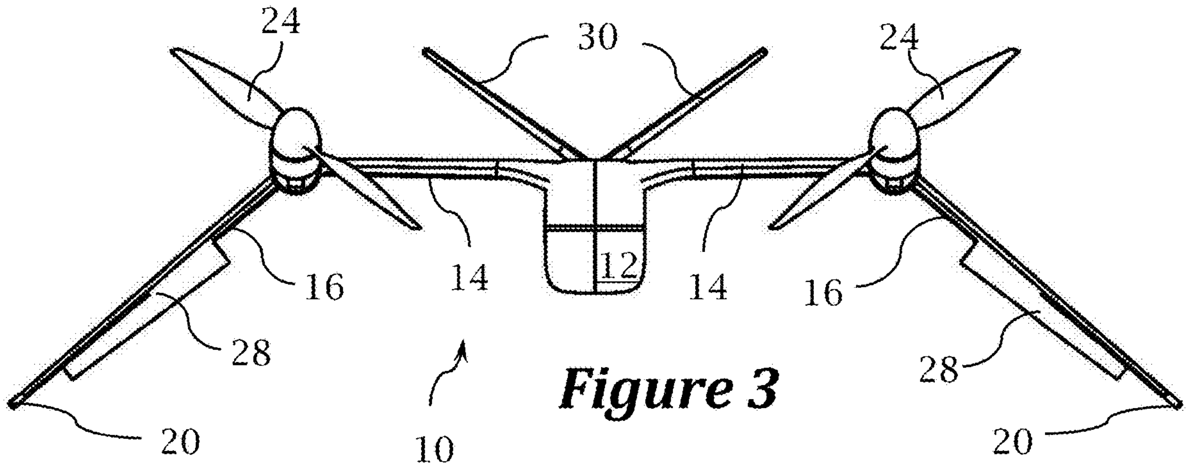
FIG. 3 shows the aeronautical apparatus of FIGS. 1 and 2 with the outboard wing portions partially unfolded and the propellers oriented at an angle to facilitate transition from vertical to forward flight.
Figure 4:
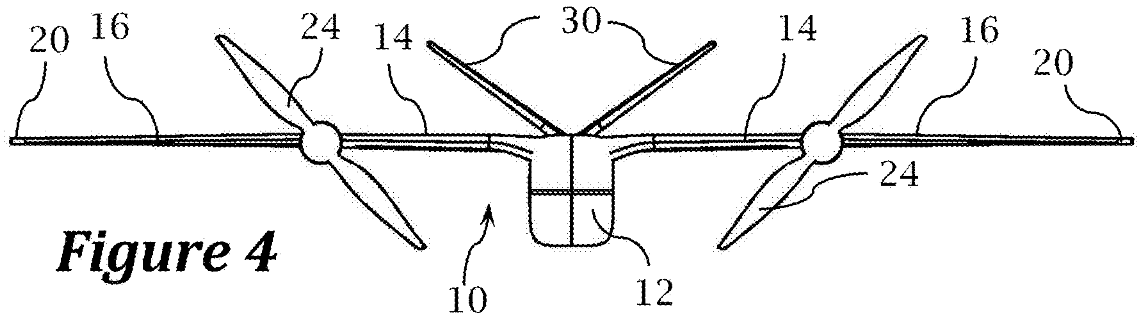
FIG. 4 shows the aeronautical apparatus of FIGS. 1-3 with the outboard wing portions completely unfolded, neutral outboard control surfaces (in line with the outboard wing portion), and the propellers oriented for forward flight.
Figure 5:
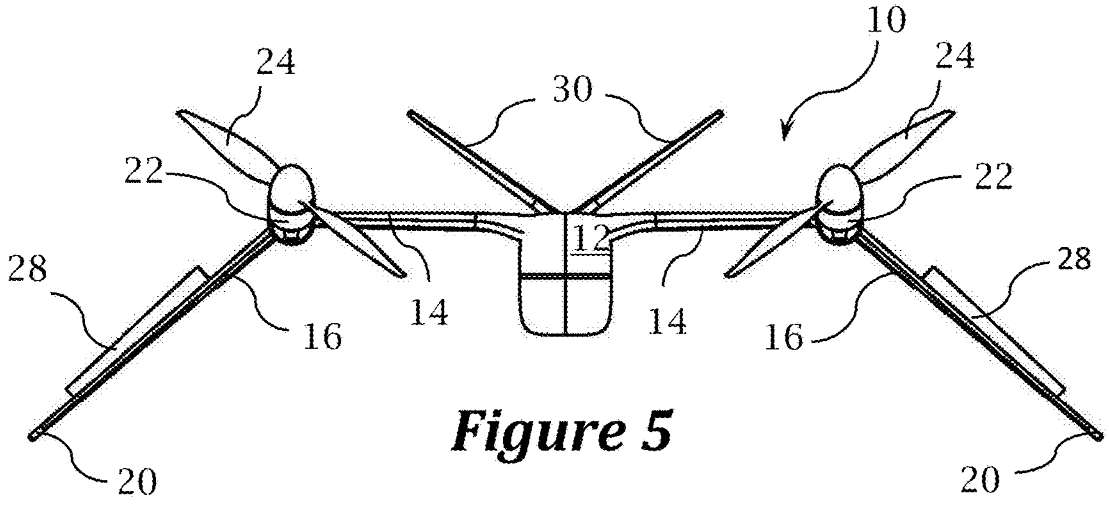
FIG. 5 shows the aeronautical apparatus of FIGS. 1-4 with the outboard wing portions partially folded and the outboard control surfaces negatively deployed (away from the fuselage when outboard wing portion is folded) to cause the outboard wing portions to fold.

Aeronautical apparatus 10 has a hinge between inboard wing portion 14 and outboard wing portion 16. To cause outboard wing portion 16 to unfold, outboard control surface 28 is positively deployed, as shown in FIG. 2. Additionally, propeller motors 22 and propellers 24 are rotated forward to cause aeronautical apparatus 10 to start transitioning to forward flight. By moving forward through the air, aerodynamic forces on outboard control surfaces 28 cause outboard control surfaces 28 and outboard wing portions 16 to unfold. Such a configuration in which outboard wing portions 16 are unfolding is shown in FIG. 3. In FIG. 4, aeronautical apparatus 10 is shown in a configuration in which outboard wing portions 16 are fully unfolded for forward flight. To cause outboard wing portions 16 to fold down so that vertical flight can be attained, for example for landing, outboard control surfaces 28 on outboard wing portions 16 are negatively deployed, as shown in FIG. 5. Aerodynamic forces on outboard control surfaces 28 during forward flight cause outboard control surfaces 28 and outboard wing portions 16 to fold.

Figure 6:
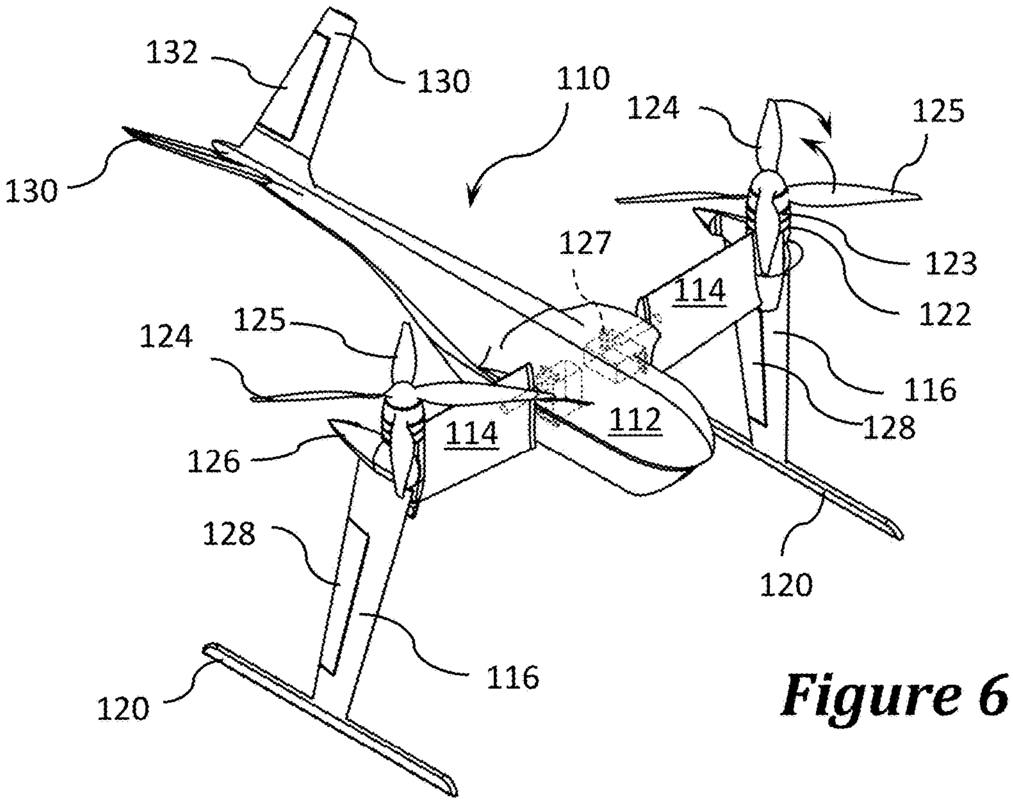
FIG. 6 shows an alternative embodiment of an aeronautical apparatus with outboard wing portions folded and inboard wing portions and propellers oriented for vertical flight.

An alternative aeronautical apparatus 110 is shown in FIG. 6. Aeronautical apparatus 110 has a fuselage 112 with two wings, each having: an inboard wing portion 114 and an outboard wing portion 116. Inboard wing portion 114 is rotatable with respect to fuselage 112. Thrust angle motor 127 rotates inboard wing portion 114. In aeronautics, the chord is an imaginary straight line joining the leading edge and trailing edge of an airfoil or wing. During forward flight, the chord of the wing is nearly parallel with the longitudinal axis of the fuselage. It is well known by one skilled in the art that the angle of attack of the wing, which is the amount that the chord of the wing differs from being parallel to the longitudinal axis of fuselage 112 is in the range of 2-5 degrees, i.e., not exactly parallel. In FIG. 6, in which aeronautical apparatus 110 is shown in vertical flight configuration, the chord of wing portion 114 is substantially parallel to the vertical axis (axes applicable to FIG. 6 are shown in FIG. 1 and described above), reducing the obstruction of thrust. The location where the wing portions 114 and

116 hinge with respect to each other is at nacelle 126. Counter rotating propeller motors 122 and 123 couple to propellers 124 and 125, respectively. See the arrows associated with propellers 124 and 125 on the right-hand side of FIG. 6, which illustrate their rotation directions. Outboard wing portions 116 have outboard control surfaces 128 and landing poles 120. Aeronautical apparatus 110 has a V-tail, similar to that shown in FIGS. 1-5, with two stabilizers 130 arranged in a V and each having aft control surfaces 132.

Figure 7:
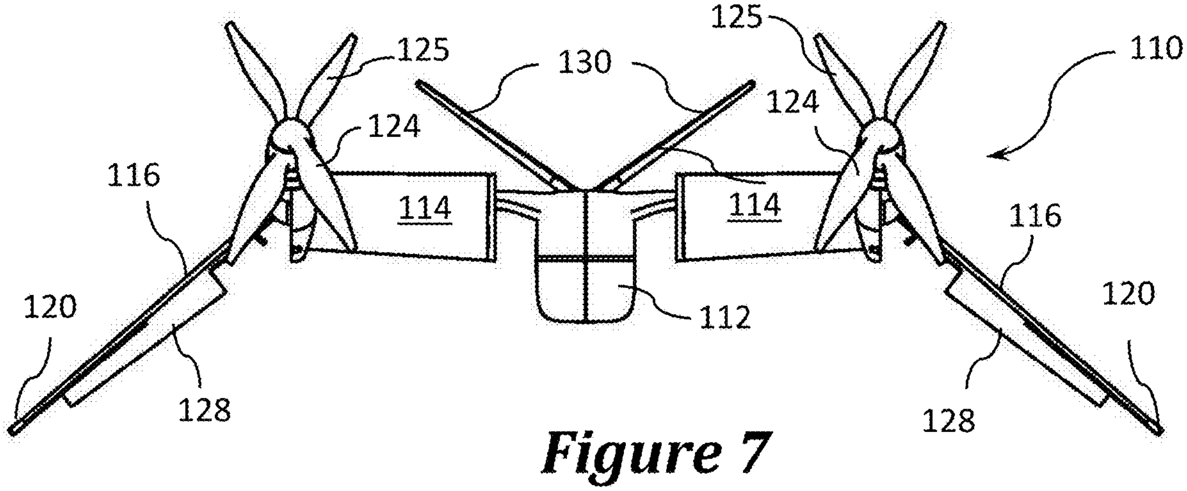
FIG. 7 shows a front view of the aeronautical apparatus of FIG. 6 with outboard control surfaces positively deployed to cause the outboard wing portions to unfold, and the inboard wing portions and propellers oriented at an angle to facilitate transition from vertical to forward flight.
Figure 8:
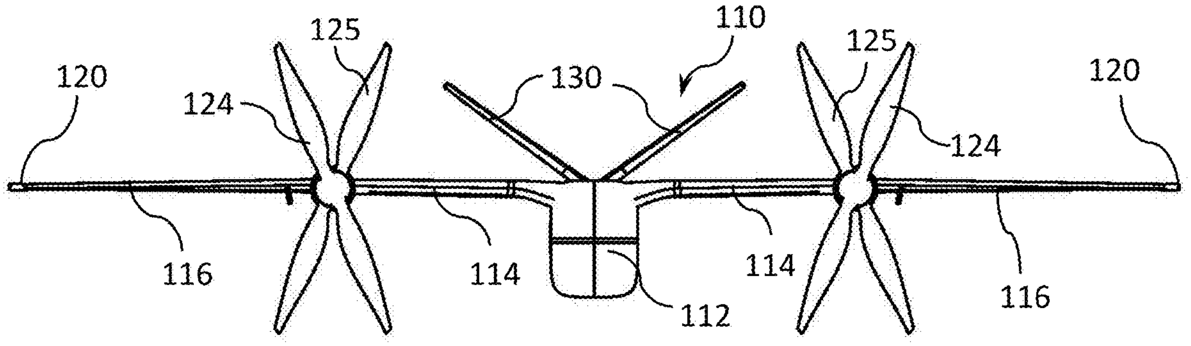
FIG. 8 shows the aeronautical apparatus of FIGS. 6 and 7 in forward flight with neutral outboard control surfaces.

Aeronautical apparatus 110 is shown with inboard wing portions 114 in a transition orientation (chord between being substantially parallel to vertical and longitudinal axis) in FIG. 7. Propellers 124 and 125 are partially oriented forward and outboard control surfaces 128 are positively deployed in FIG. 7. Outboard control surfaces 128 being deployed as such lead to forces on outboard control surfaces 128 and wing portions 116 to cause them to unfold to a forward flight position, which is shown in FIG. 8. In FIG. 8, propellers 124 and 125 are fully oriented for forward flight (i.e., axes of rotation of propellers 124 and 125 are substantially parallel to the longitudinal axis). Inboard wing portion 114 has been oriented so that the chord of inboard wing portion 114 is substantially parallel to the longitudinal axis of aeronautical apparatus 110. In the view shown in FIG. 8, outboard control surfaces 128 are not visible because they are in line with outboard wing portions 116. Outboard control surfaces 128 may be used for causing aeronautical apparatus to fly in a desired trajectory in which case they will be visible in such a view as in FIG. 8.

Figure 9:
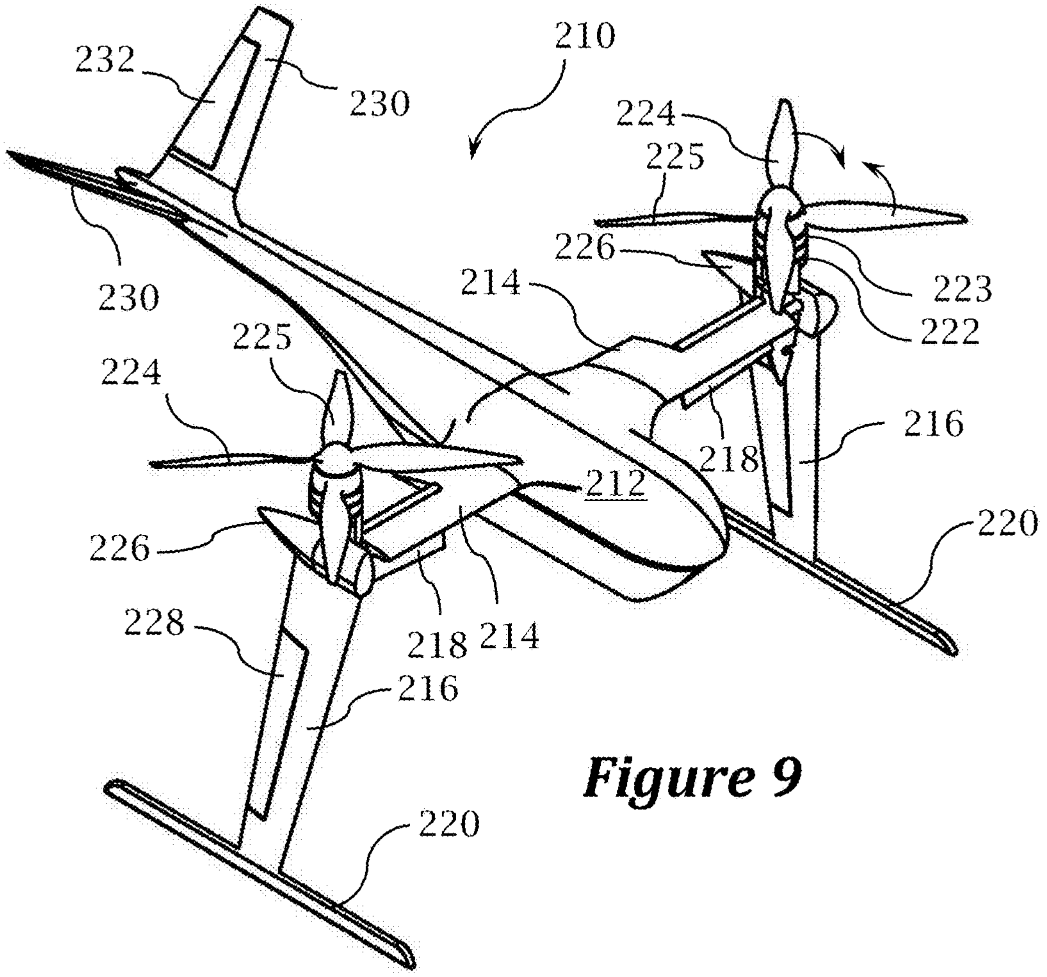
FIG. 9 shows an alternative embodiment of an aeronautical apparatus with outboard wing portions folded and inboard control surfaces and propellers oriented for vertical flight.

Yet another embodiment of an aeronautical apparatus 210 in a vertical flight configuration is shown in FIG. 9. Aeronautical apparatus 210 has a fuselage 212 having two wings, each having an inboard wing portion 214 and outboard wing portion 216. Inboard wing portions 214 have inboard control surfaces 218 and outboard wing portions 216 have outboard control surfaces 228 and landing poles 220. Inboard control surfaces 218 are shown in a vertical flight orientation to reduce thrust obstruction in vertical flight. Nacelle 226 is located between inboard wing portion 214 and outboard wing portion 216. Aeronautical apparatus 210 has counter rotating propeller motors 222 and 223 connected to counter rotating propeller 224 and 225, respectively. Arrows associated with propellers 224 and 225 on the right-hand side of FIG. 9 are shown indicating the counter rotating nature of propellers 224 and 225. Stabilizers 230 at the aft of aeronautical apparatus 210 form a V. Each of stabilizers 230 has an aft control surface 232 which can be deployed to assist in achieving a desired trajectory.

Figure 10:
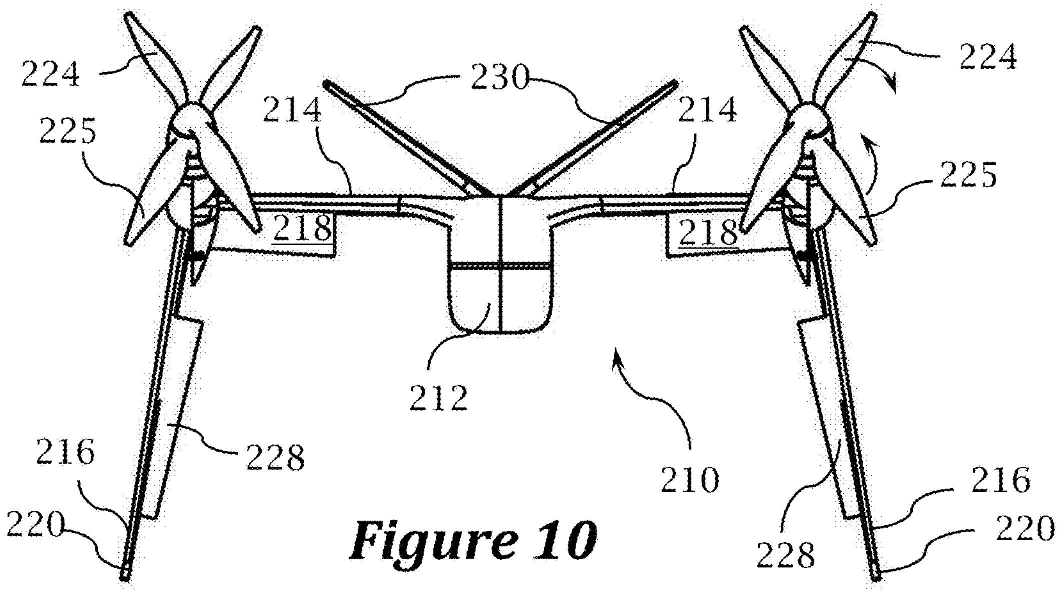
FIG. 10 shows a front view of the aeronautical apparatus of FIG. 9 with outboard wing portions folded, outboard control surfaces positively deployed, and inboard control surfaces and propellers oriented at an angle to facilitate transition from vertical to forward flight.
Figure 11:
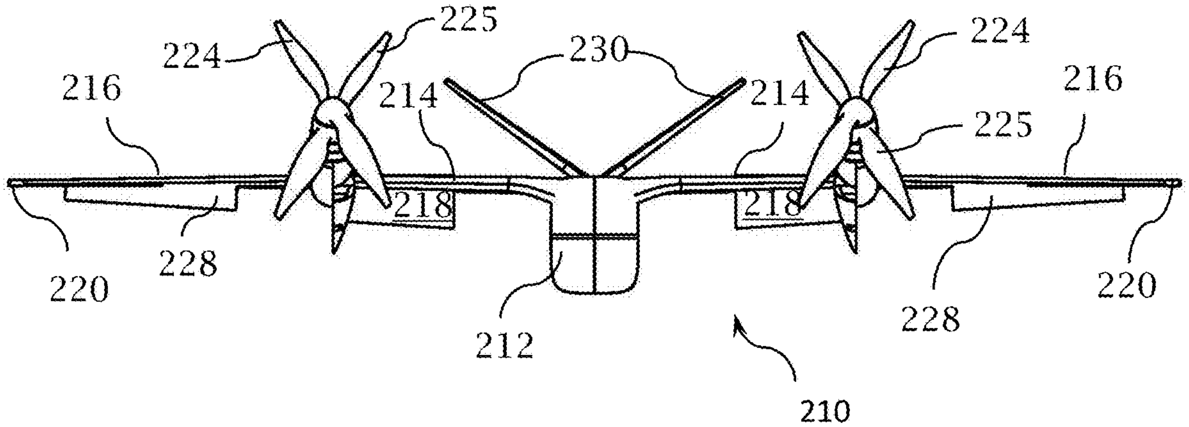
FIG. 11 shows the aeronautical apparatus of FIGS. 9-10 with outboard wing portions unfolded, outboard control surfaces positively deployed, and the inboard control surfaces and propellers oriented at an angle to facilitate transition from vertical to forward flight.

FIG. 10 shows aeronautical apparatus 210 with outboard control surfaces 228 positively deployed and propellers 224 and 225 and propeller motors 222 and 223 and inboard control surfaces 218 in a transition orientation. In FIG. 11, outboard wing portions 216 have fully unfolded. Now that outboard wing portions 216 are fully unfolded, deployment of outboard control surfaces 228 is no longer needed for folding out the wings. Outboard control surfaces 228 can be moved so that they are in line with outboard wing portions 216.

Figure 12:
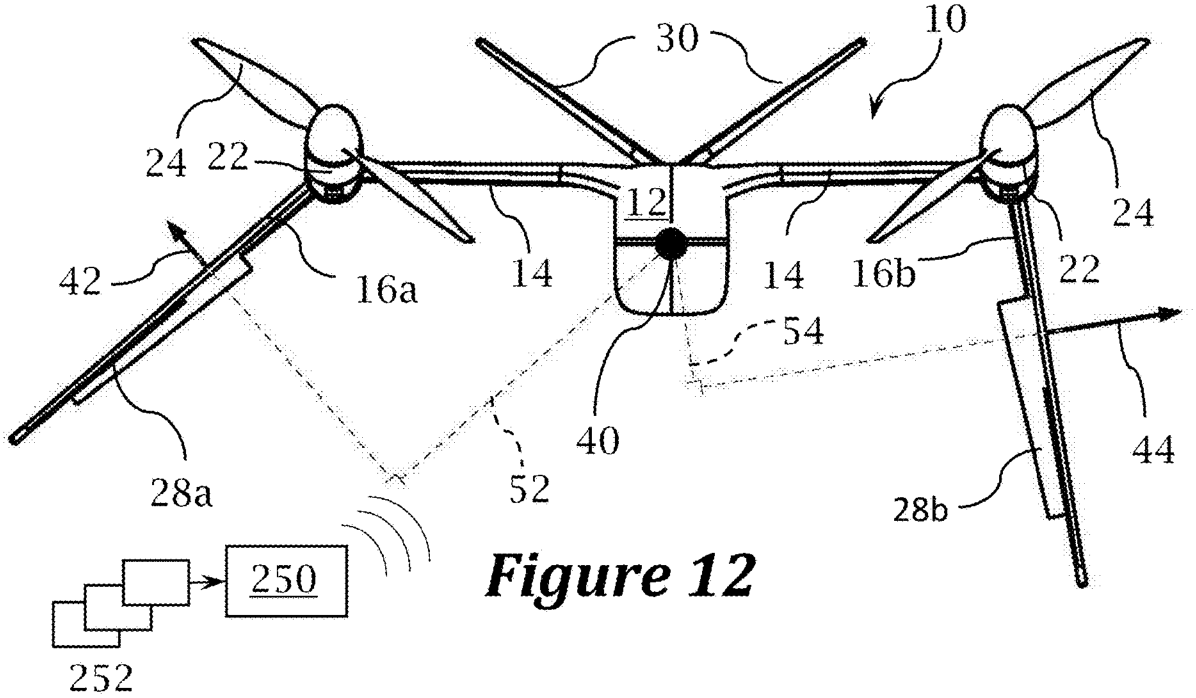
FIG. 12 shows the aeronautical apparatus of FIGS. 1-5 with the propellers oriented at an angle to facilitate transition from vertical to forward flight, the outboard wing portions at different fold angles, the outboard control surfaces at different levels of deployment, and a signal to facilitate control.

If outboard wing portions, (16 in FIGS. 1-5; 116 in FIGS. 6-8; and 216 in FIGS. 9-11) do not unfold at the same rate, for whatever reason, the design provides a way for greater force to be applied to the less unfolded wing to cause it to catch up. A view toward the nose of the embodiment of FIG. 1 is shown in FIG. 12 in which the unfolding of the wings is asymmetric with a left (when looking from the front) outboard wing portion 16*a* more unfolded than a right outboard wing portion 16*b*. The center of gravity is denoted by a large black dot 40. Outboard control surface 28*b* of outboard wing portion 16*b* is deployed such that in forward flight, it has more frontal area open to the oncoming air than outboard control surface 28*a*. This increases the force acting on outboard wing portion 16*b*, as illustrated by arrow 44, which is associated with outboard wing portion 16*b* compared to that of outboard wing portion 16*a*, which has a much shorter arrow 42. The length of the arrow is indicative of the relative forces acting on the associated wing portions. This has little effect on stability because the larger force (arrow 44) is acting on a short lever arm, which is indicated by dashed line 54, compared to the longer lever arm, indicated by dashed line 52, associated with wing portion 16*a*. By actuating outboard control surfaces 28*a* and 28*b*, any divergence in the unfolding of the two sides can be managed without causing instability.

Also shown in FIG. 12 is an electronic control unit (ECU) 250. ECU 250 is provided signals 252 which could be anything from onboard aeronautical apparatus 10 such as, location, angle of thrust angle motors (not shown in FIG. 12), fold position of outboard wing portions 16*a* and 16*b*, deployment of outboard control surfaces 28*a* and 28*b*, battery charge, etc. or environmental factors, such as temperature, wind speed, barometric pressure, etc. Additionally, a flight mission is assigned to ECU 250 from which a desired trajectory is computed. Alternatively, a user/operator provides information to ECU 250 about a desired trajectory. Based on all the data captured, ECU 250 computes operational information, including: speeds for propeller motors, angle of propeller motors (for propeller motors that change direction via a thrust angle motor), and the deployment of outboard control surfaces of 28*a* and 28*b*. ECU 250 commands the operational information to the actuators, i.e., the propeller motors, the thrust angle motors, and the control surfaces. ECU 250 can be located onboard the aircraft to facilitate autonomous operation remotely. If ECU 250 is onboard, the communication may be through wires. Otherwise, ECU 250 communicates wirelessly in any manner known to one skilled in the art.

Figure 13:
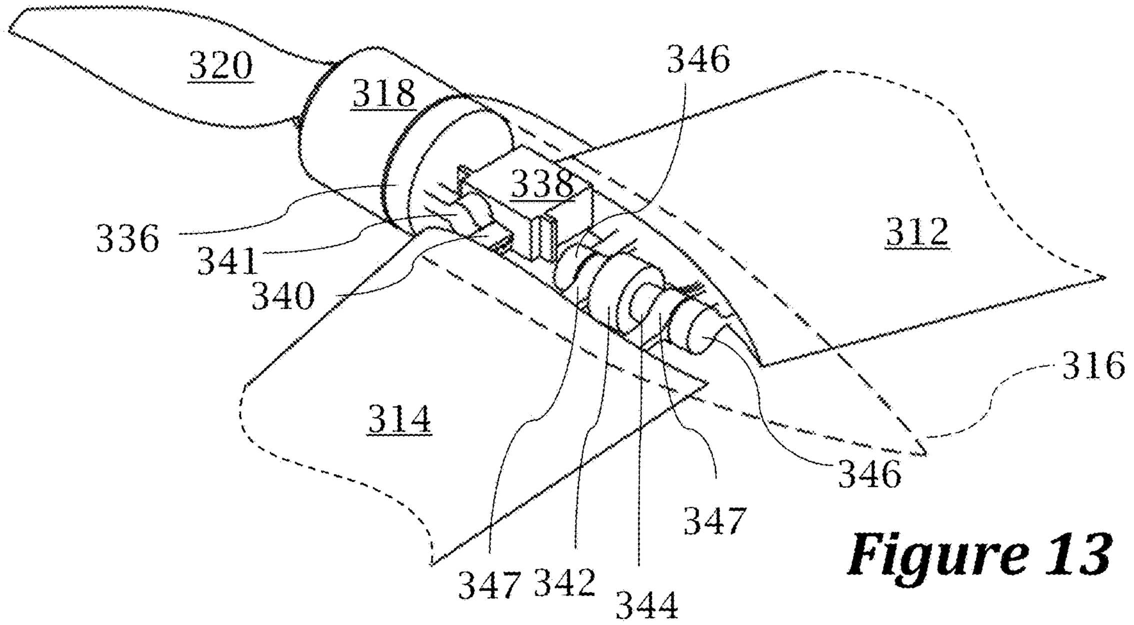
FIG. 13 shows a nacelle positioned between inboard and outboard wing portions with a hinge mechanism disposed within and the outboard wing portion unfolded for forward flight.
Figure 14:
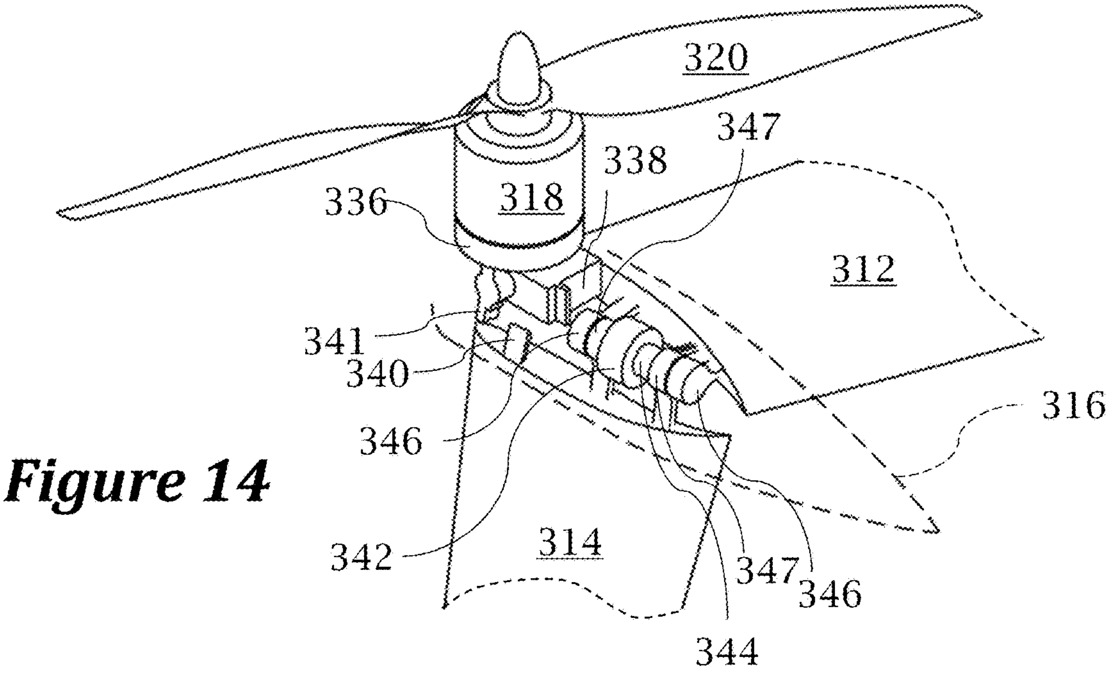
FIG. 14 shows the nacelle of FIG. 13 with the outboard wing portion folded for vertical flight.

Details of one embodiment of a folding mechanism enclosed inside a nacelle 316 (shown in phantom to view internal elements) are more readily apparent in isometric views in FIGS. 13 and 14. In FIG. 13, a representation of the unfolded wing with an inboard wing portion 312 in line with outboard wing portion 314. A thrust angle motor 338 adjusts propeller motor 318 and propeller 320 to the forward flight orientation in FIG. 13. Connections between hinge portions 346 and inboard wing portion 312 and connections between hinge portions 347 and outboard wing portion 314 are apparent in FIG. 13. Also shown in FIG. 13 is a rotational damper 342 and torque adjusting motor 344 that are disposed between hinge portions 347. Rotational damper 342 is provided to avoid rapid changes in the folding and unfolding due to turbulence or other aerodynamic effects that would otherwise be jarring. Torque adjusting motor 344 alters the effect of damper 342.

In FIG. 14, outboard wing portion 314 is pointing downward, i.e., the folded position. Thrust angle motor 338 has rotated propeller motor 318 and propeller 320 to the vertical flight orientation.

In several embodiments shown herein, a latching mechanism to maintain the wing in an unfolded position or a in a folded position includes a clasp and a stop. FIGS. 13 and 14 show a latch, which includes a stop 341 that rotates with propeller motor 318 and a clasp 340 which rotates with outboard wing portion 314. When outboard wing portion 314 unfolds before propeller motor 318 is commanded into the forward flight orientation, stop 341 goes behind clasp 340. When propeller motor 318 is in the forward flight orientation before outboard wing portion 314 unfolds, clasp 340 slips past stop 341 and latches in place. Once propeller motor 318 is fully in the forward flight orientation, as in FIG. 13, clasp 340 is latched into stop 341 so that outboard wing portion 314 cannot refold until propeller motor 318 is commanded to transition to vertical/hover flight mode, as in FIG. 14, stop 341 is rotated down and away from clasp 340 and outboard wing portion 314 is free to move. In an alternative embodiment, such an analogous latching mechanism is employed to hold outboard wing portion 314 in the folded position when the propeller motor is in the vertical flight orientation.

Figure 15:
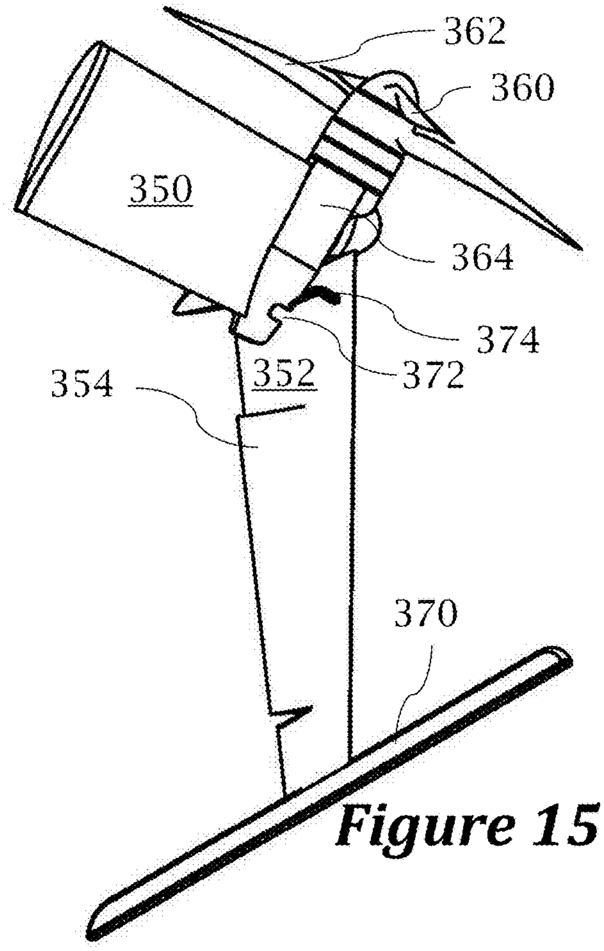
FIG. 15 shows a wing with inboard wing portion and propeller oriented at an angle to facilitate transition from vertical to forward flight, outboard wing portion folded, and a latching mechanism.

FIG. 15 shows a latch which includes a stop 374 that rotates with an outboard wing portion 352 and a clasp 372 which rotates with an inboard wing portion 350. FIG. 15 shows a configuration between vertical flight and forward flight where a propeller 360 and a propeller 362 are oriented halfway between vertical and forward. A nacelle section 364 is coupled to inboard wing portion 350 which is oriented halfway between vertical and forward in this configuration. An outboard control surface 354 on outboard wing portion 352 is shown positively deployed to facilitate a strong unfolding force on outboard wing portion 352. A Landing pole 370 is shown at the tip of outboard wing portion 352.

Figure 16:
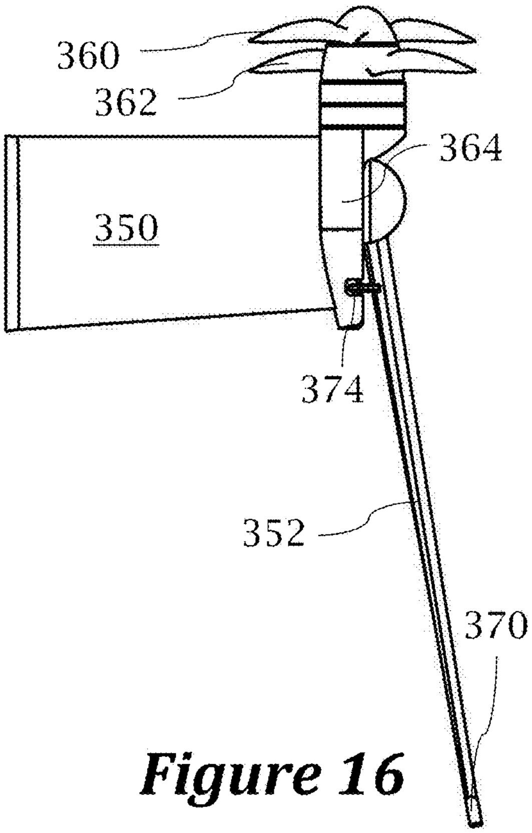
FIG. 16 shows a front view of the wing of FIG. 15 with the inboard wing portion and propeller oriented for vertical flight, the outboard wing portion folded, and the latching mechanism engaged.
Figure 17:
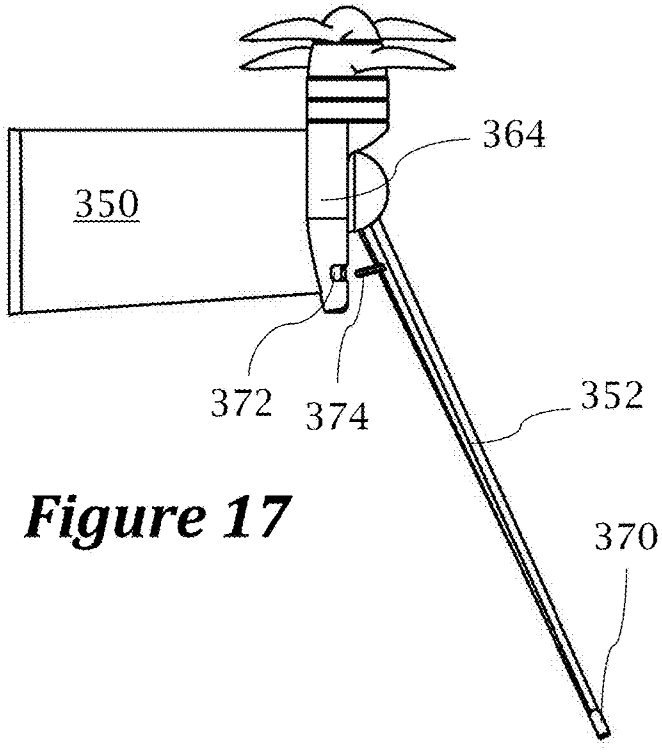
FIG. 17 shows the wing of FIGS. 15-16 with the inboard wing portion and propeller oriented for vertical flight and the outboard wing portion between folded and unfolded positions.

FIG. 16 shows the embodiment of FIG. 15 in vertical flight configuration with the latch including stop 374 secured in clasp 372 (clasp 372 not provided a numeral in FIG. 16 as it is filled with stop 374). Inboard wing portion 350, propeller 360 and propeller 362 are oriented for vertical flight and outboard wing portion 352 is fully folded. When inboard wing portion 350 is in vertical flight orientation before outboard wing portion 352 has fully folded, as shown in FIG. 17, stop 374 clips into clasp 372 as outboard wing portion 352 rotates into fully folded position. When outboard wing portion 352 is fully folded before inboard wing portion 350 is in vertical flight orientation, as shown in FIG. 15, clasp 372 moves in behind stop 374 as inboard wing portion 350 rotates into vertical flight orientation. When the latch including stop 374 and clasp 372 is secured, as shown in FIG. 16, clasp 372 moves out from behind stop 374 as inboard wing portion 350 rotates into forward flight orientation, allowing outboard wing portion 352 to unfold.

Figure 18:
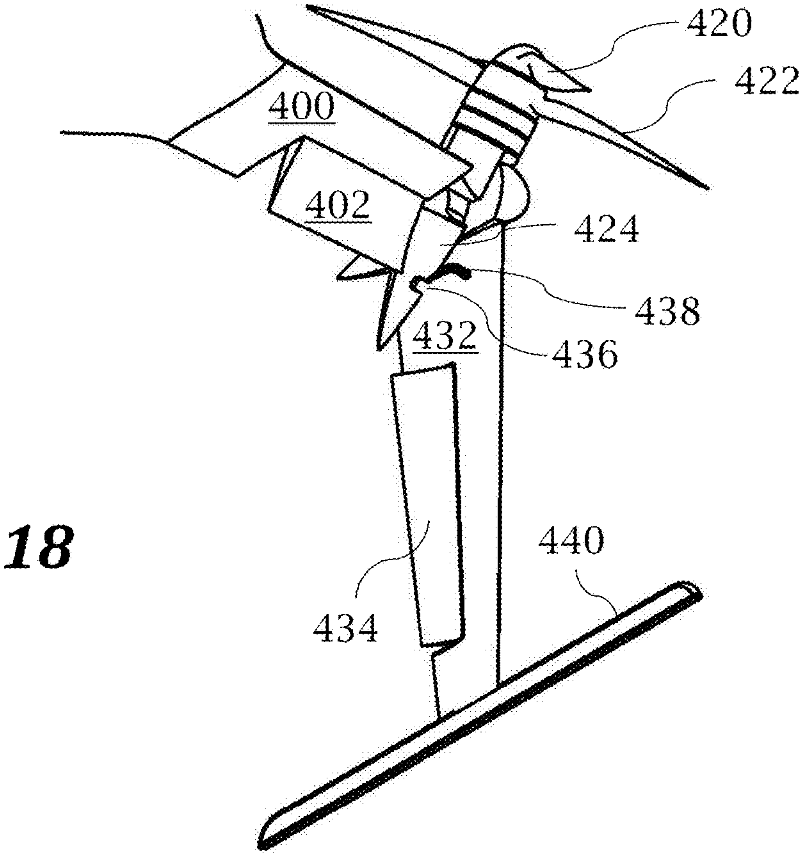
FIG. 18 shows a wing with an inboard control surface and propeller oriented at an angle to facilitate transition from vertical to forward flight, outboard wing portion folded, and a latching mechanism.

FIG. 18 shows an alternative embodiment to the one shown in FIGS. 15-17, with an inboard wing portion 400 coupled to an inboard control surface 402. A clasp 436 rotates with inboard control surface 402. A Propeller 420 and a propeller 422 rotate with inboard control surface 402 via a nacelle section 424. A stop 438 rotates with an outboard wing portion 432. An outboard control surface 434 is coupled to outboard wing portion 432 and a landing pole 440 is located at the tip of outboard wing portion 432. When inboard control surface 402 is in vertical flight orientation before outboard wing portion 432 has fully folded, stop 438 clips into a clasp 436 as outboard wing portion 432 rotates into fully folded position. When outboard wing portion 432 is fully folded before inboard control surface 402 is in vertical flight orientation, as shown in FIG. 18, clasp 436 moves in behind stop 438 as inboard control surface 402 rotates into vertical flight orientation. When the latch including stop 438 and clasp 436 is secured, clasp 436 moves out from behind stop 438 as inboard control surface 402 rotates into forward flight orientation, allowing outboard wing portion 432 to unfold.

Details of one embodiment of a folding mechanism enclosed inside a nacelle 516 (shown in phantom to view internal elements) are apparent in isometric views in FIGS. 19 and 20. FIG. 19 represents the unfolded wing with an inboard wing portion 512 in line with outboard wing portion 514. A thrust angle motor 538 adjusts propeller motor 518 and propeller 520 to the forward flight orientation in FIG. 19. Connections between hinge portions 546 and inboard wing portion 512 and connections between hinge portions 547 and outboard wing portion 514 are apparent in FIG. 19. Also shown in FIG. 19 is a bidirectional one-way ratchet/bearing 542 and a direction switcher 544 that are disposed between hinge portions 546 and 547. The bidirectional one-way ratchet/bearing 542 is provided to allow outboard wing portion 514 to only move in one direction based on the setting of direction switcher 544. Direction switcher 544 changes the direction the outboard wing portion 514 can move by altering the internal geometry of bidirectional one-way ratchet/bearing 542. Setting of the direction switcher 544 is controlled by a mechanical link 540 to the thrust angle motor 538, such that when the thrust angle motor 538 has moved the propeller motor 518 and propeller 520 into the forward flight orientation, the direction switcher 544 is in the setting such that bidirectional one-way ratchet/bearing 542 only allows outboard wing portion 514 to unfold as shown in FIG. 19.

In FIG. 20, outboard wing portion 514 is pointing downward, i.e., the folded position. Thrust angle motor 538 has rotated propeller motor 518 and propeller 520 to the vertical flight orientation. Mechanical link 540 coupled to thrust angle motor 538 has toggled the setting of the direction switcher 544 so that the bidirectional one-way ratchet/bearing 542 only allows the outboard wing portion 514 to fold as shown in FIG. 20.

In FIG. 20, outboard wing portion 514 is pointing downward, i.e., the folded position. Thrust angle motor 538 has rotated propeller motor 518 and propeller 520 to the vertical flight orientation. Mechanical link 540 coupled to thrust angle motor 538 has toggled the setting of the direction switcher 544 so that the bidirectional one-way ratchet/bearing 542 only allows the outboard wing portion 514 to fold as shown in FIG. 20.

Bidirectional one-way ratchet/bearing 542 acts a latching mechanism because when in one of the two positions, the wing (made up of portions 512 and 514) may only rotate to cause the wing to fold. If an updraft or other disturbance that would normally cause the wing to unfold were to encounter the wing, bidirectional one-way ratchet/bearing 542 prevents rotation toward the unfolded position. Because bearing 542 allows movement in only one rotational direction, wing portion 512 ultimately attains the folded position and cannot unfold thereby latching the wing in the folded position. As described above, when thrust angle motor 538 causes mechanical link 540 to toggle direction switcher 544, bearing 542 allows movement in the other rotational direction which causes the wing to unfold, and only allows movement in that rotational direction until thrust angle motor is actuated to cause mechanical link 540 to toggle direction switcher 544.

While the best configuration has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, efficiency, strength, durability, life cycle cost, marketability, speed, endurance, range, appearance, packaging, size, serviceability, weight, manufacturability, ease of assembly, etc. The embodiments described herein that are characterized as less desirable than other embodiments or prior-art implementations with respect to one or more characteristics are not outside the scope of the disclosure and may be desirable for particular applications.

I claim:

1. An aeronautical apparatus, comprising:
- a fuselage having a longitudinal axis, a transverse axis and a vertical axis;
- a first wing attached to a right side of the fuselage; and
- a second wing attached to a left side of the fuselage, wherein:
  - the first wing has a first inboard wing portion coupled to a first outboard wing portion via a first hinge;
  - the second wing has a second inboard wing portion coupled to a second outboard wing portion via a second hinge;
  - the first outboard wing portion folds downward with respect to the first inboard wing portion;
  - the second outboard wing portion folds downward with respect to the second inboard wing portion;
  - the first outboard wing portion has a first control surface which is configured to fold with respect to the first outboard wing portion; and
  - the second outboard wing portion has a second control surface which is configured to fold with respect to the second outboard wing portion, the aeronautical apparat us further comprising:
  - an electronic control unit (ECU) configured to communicate signals to the first control surface and the second control surface wherein:
  - the ECU determines a desired control surface deployment of the first control surface and second control surface based at least on a fold angle of the first hinge a ad the second hinge.

2. The aeronautical apparatus of claim 1 wherein:
- an axis of rotation of the first hinge and the second hinge are substantially parallel with respect to the longitudinal axis of the fuselage.

3. The aeronautical apparatus of claim 1 wherein:
- an axis of rotation of the first hinge is skewed with respect to the longitudinal axis of the fuselage; and
- an axis of rotation of the second hinge is skewed with respect to the longitudinal axis of the fuselage.

4. The aeronautical apparatus of claim 1 wherein:
- the first wing has a folded position and an unfolded position; and
- the second wing has a folded position and an unfolded position, the aeronautical apparatus further comprising:
- a first latching mechanism associated with the first hinge to restrain the first outboard wing portion to remain in the folded position during landing;
- a second latching mechanism associated with the second hinge to restrain the second outboard wing portion to remain in the folded position during landing.

5. The aeronautical apparatus of claim 1 wherein the first and second hinges are rotationally damped.

6. The aeronautical apparatus of claim 5, further comprising:
- a first damper adjacent to the first hinge to provide the rotational damping of the first hinge;
- a second damper adjacent to the second hinge to provide the rotational damping of the second hinge;
- a first torque adjusting motor adjacent to the first damper; and
- a second torque adjusting motor adjacent to the second damper, wherein:
- the first torque adjusting motor, when actuated, changes the amount of damping of the first damper; and
- the second torque adjusting motor, when actuated, changes the amount of damping of the second damper.

7. The aeronautical apparatus of claim 1, further comprising:
- a first nacelle coupled to the inboard portion of the first wing;
- a second nacelle coupled to the inboard portion of the second wing;
- a first propeller motor disposed within the first nacelle;
- a second propeller motor disposed within the second nacelle;
- a first propeller coupled to the first propeller motor; and
- a second propeller coupled to the second propeller motor.

8. The aeronautical apparatus of claim 7, further comprising:
- a first thrust angle motor located within the first nacelle and coupled to the first propeller motor; and
- a second thrust angle motor located within the second nacelle and coupled to the second propeller motor, wherein: the first and second thrust angle motors each have an axis of rotation substantially parallel to the transverse axis.

9. The aeronautical apparatus of claim 8, further comprising:
- a first one-way bearing coupled on axis with the first hinge;
- a second one-way bearing coupled on axis with the second hinge;
- a first switch coupled to and actuated by the first thrust angle motor, the first switch also being coupled to the first one-way bearing; and
- a second switch coupled to and actuated by the second thrust angle motor, the second switch also being coupled to the second one-way bearing, wherein:
  - the first switch, when actuated by the first thrust angle motor, toggles between a first setting in which the first outboard wing portion is allowed to rotate from a folded position to an unfolded position only and a second setting in which the first outboard wing portion is allowed to rotate from the unfolded position to the folded position only; and
  - the second switch, when actuated by the second thrust motor, toggles between a first setting in which the second outboard wing portion is allowed to rotate from a folded position to an unfolded position only and a second setting in which the second outboard wing portion is allowed to rotate from the unfolded position to the folded position only.

10. The aeronautical apparatus of claim 1, wherein the first and second inboard wing portions are rotatable with respect to the fuselage.

11. The aeronautical apparatus of claim 10, wherein a chord of the first inboard wing portion and a chord of the second inboard wing portion are substantially parallel to a vertical axis of the fuselage.

12. The aeronautical apparatus of claim 10, further comprising:
- a first latching mechanism associated with the first inboard wing portion to restrain the first outboard wing portion to remain in the folded position during landing;

a second latching mechanism associated with the second inboard wing portion to restrain the second outboard wing portion to remain in the folded position during landing.

13. The aeronautical apparatus of claim 1, wherein:

the first inboard wing portion has a control surface which is configured to fold; and the second inboard wing portion has a control surface that is configured to fold.

14. The aeronautical apparatus of claim 13, wherein:

the control surface of the first inboard wing portion is folded so that it is substantially parallel to the vertical axis during vertical flight; and the control surface of the second inboard wing portion is folded so that it is substantially parallel to the vertical axis during vertical flight.

15. The aeronautical apparatus of claim 13, further comprising:

a first latching mechanism associated with the control surface of the first inboard wing portion to restrain the first outboard wing portion to remain in the folded position during landing;

a second latching mechanism associated with the control surface of the second inboard wing portion to restrain the second outboard wing portion to remain in the folded position during landing.

16. An aeronautical apparatus, comprising:

a fuselage having a longitudinal axis, a transverse axis and a vertical axis;

a first wing attached to a right side of the fuselage; and a second wing attached to a left side of the fuselage, wherein:

the first wing has a first inboard wing portion coupled to a first outboard wing portion via a first hinge;

the second wing has a second inboard wing portion coupled to a second outboard wing portion via a second hinge;

the first outboard wing portion folds downward with respect to the first inboard wing portion;

the second outboard wing portion folds downward with respect to the second inboard wing portion;

the first and second inboard wing portions are rotatable along an axis substantially parallel to the transverse axis;

the first outboard wing portion has a first control surface which is configured to fold with respect to the first outboard wing portion; and the second outboard wing portion has a second control surface which is configured to fold with respect to the second outboard wing portion.

17. The aeronautical apparatus of claim 16, further comprising:

a first latching mechanism associated with the first hinge to restrain the first outboard wing portion to remain in the unfolded position during forward flight;

a second latching mechanism associated with the second hinge to restrain the second outboard wing portion to remain in the unfolded position during forward flight.

18. An aeronautical apparatus, comprising:

a fuselage having a longitudinal axis, a transverse axis and a vertical axis;

a first wing attached to a right side of the fuselage; and a second wing attached to a left side of the fuselage, wherein:

the first wing has a first inboard wing portion coupled to a first outboard wing portion via a first hinge;

the second wing has a second inboard wing portion coupled to a second outboard wing portion via a second hinge;

the first hinge allows the first outboard wing portion to fold downward with respect to the first inboard wing portion;

the second hinge allows the second outboard wing portion to fold downward with respect to the second inboard wing portion;

the first inboard wing portion has a first inboard control surface which is configured to fold;

the second inboard wing portion has a second inboard control surface that is configured to fold;

the first outboard wing portion has a first outboard control surface which is configured to fold with respect to the first outboard wing portion; and the second outboard wing portion has a second outboard control surface which is configured to fold with respect to the second outboard wing portion, the aeronautical apparatus further comprising:

a first one-way bearing coupled on axis with the first hinge;

a second one-way bearing coupled on axis with the second hinge;

a first switch coupled to and actuated by the first thrust angle motor, the first switch also being coupled to the first one-way bearing; and a second switch coupled to and actuated by the second thrust angle motor, the second switch also being coupled to the second one-way bearing, wherein:

the first switch, when actuated by the first thrust angle motor, toggles between a first setting in which the first outboard wing portion is allowed to rotate from a folded position to an unfolded position only and a second setting in which the first outboard wing portion is allowed to rotate from the unfolded position to the folded position only; and the second switch, when actuated by the second thrust motor, toggles between a first setting in which the second outboard wing portion is allowed to rotate from a folded to an unfolded position only and a second setting in which the second outboard wing portion is allowed to rotate from the unfolded position to the folded position only.

19. The aeronautical apparatus of claim 18, further comprising:

an electronic control unit (ECU) configured to communicate signals to the first control surface and the second control surface wherein:

the ECU determines a desired control surface deployment of the first control surface and of the second control surface based at least on a fold angle of the first hinge and the second hinge.

* * * * *